Sept. 8, 1964   M. A. MILLER   3,147,902
COMPOSITE BODY CONTAINERS
Filed April 16, 1962
*Fig. 1.*
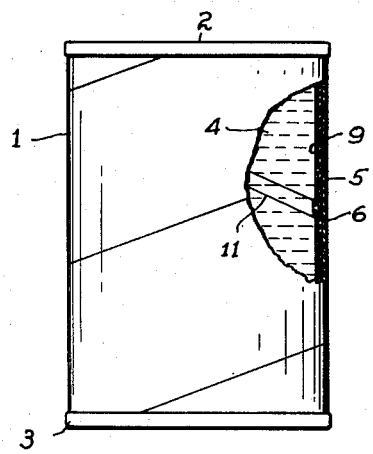
*Fig. 2.*
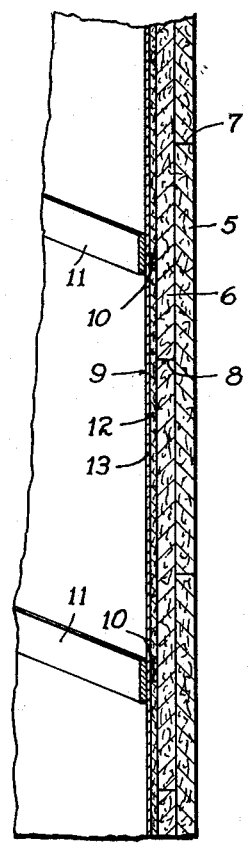
*Fig. 3.*
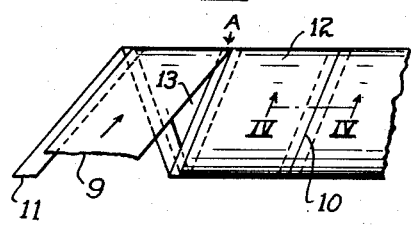
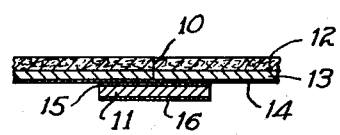
*Fig. 4.*
INVENTOR.
Mike A. Miller
BY
Howard B. Funk
ATTORNEY United States Patent Office 3,147,902
Patented Sept. 8, 1964

3,147,902
COMPOSITE BODY CONTAINERS
Mike Anthony Miller, New Kensington, Pa., assignor to Aluminum Company of America, Pittsburgh, Pa., a corporation of Pennsylvania
Filed Apr. 16, 1962, Ser. No. 187,712
3 Claims. (Cl. 229—4.5)

This invention relates particularly to containers or cans made from spirally wound paper tubing and provided with metal ends and an impervious lining of thin metal foil to be liquid and oil proof.

Containers or cans of this kind are presently manufactured in large volume by winding strips of the body forming elements thereof on the mandrel of a helical or so-called spiral winding machine to form a continuous, unitary foil lined tube which is cut into the lengths desired for the can bodies. Metal end caps are applied to these bodies to provide the finished containers. Because of their substantially impervious and leakproof nature and low cost, cans or containers of this kind are highly desired for the economical packaging of various foodstuffs and other materials, including those in the category of semifluids, oils, greases, or the like, for shipment, storage and eventual retail sale. However, such containers have presented a serious problem in connection with capillary seepage, known as "wicking," at the internal spiral seam which, in time, leads to unsightliness and body deterioration inimical to saleability and shelf-life. Prevention of seam wicking is necessary to enhance the value of such containers, but heretofore it has not been accomplished economically.

It is, therefore, the objective of the invention to provide spirally wound, foil lined paper containers with a wicking preventative which positively prevents wicking and which does not add materially to the unit cost of the containers, nor introduce danger of product contamination, yet will be indefinitely effective in order that the filled and sealed containers will satisfy the packers' requirements in regards to storage and shelf-life, and to do this with an extremely simple seam construction involving an overlay metal foil tape continuous along the spiral seam and adhered to the foil liner thereby to isolate and prevent contact between any paper fibers and the container contents.

The foregoing and ancillary features and advantages of the invention will appear more fully in the following description, taken in conjunction with the accompanying drawing which illustrates the same and wherein:

FIG. 1 is an elevational representation of a container with a part of its body wall broken away and showing somewhat diagrammatically the invention embodied in the construction thereof, FIG. 2 is a fragmentary view illustrating the construction and assembly of the tubular side wall of the container and showing the laminated layers of materials thereof greatly exaggerated in thickness for clarity of illustration and omitting the adhesive which face bonds them together into a unitary assembly, in order to avoid confusion, FIG. 3 is a view diagrammatically showing a forming end portion of the tubular liner and the seam sealing tape at its inside trailing edge and covering the spiral seam of the formed liner, and FIG. 4 is an enlarged detail view taken on the line IV—IV of FIG. 3 and showing the coatings provided on the inner face of the liner and on both faces of the faces of the tape, respectively.

In the drawing, reference numeral 1 indicates in general the tubular body wall of the container which is closed at its open ends by top and bottom metal end caps 2 and 3, respectively, which caps may be sealed to the body wall in any conventional, well-known way. The caps may be made from any suitable low cost material. It is to be understood that the bottom cap will be sealingly applied to the container body 1 to permit filling the container with the desired contents, for example lubricating oil indicated by reference numeral 4, after which the top cap is sealingly applied to complete the container package.

The body or side wall 1 of the container is of laminated, spiral wound construction, as shown, and includes an outer body layer 5 and an inner body layer 6 of stiff paper stock, such as kraft paper, chipboard, cardboard or other inexpensive fibrous material, to provide the desired stiffness and rigidity to the container. These layers are strips wound spirally preferably with butt or edge-to-edge seams, as indicated at 7 and 8, and laminated together with a suitable adhesive, with the seams out of register or staggered for body wall smoothness, as is conventional in the spiral tube winding art. Laminated to the inner body layer 6 is an impervious lining layer 9, also a strip wound spirally with a butt seam formation 10 between its successive turns and locked to the inner body layer 6 with a suitable overall adhesive. Spanning the seam 10 on the inside of the container and continuous along the length of the seam is a narrow seam sealing metal foil tape 11. It is contemplated that the container body will have a suitable label wrapping on the outer body layer 5, but since it, per se, forms no part of the present invention, none is shown. It is here mentioned that for some containers additional body layers or plies may be incorporated and that the thickness and kind of paper employed may be selected, as desired.

The lining layer 9 is a metal foil-paper laminate comprising a thin flexible paper strip 12 and a like strip of thin metal foil 13 face bonded together in a conventional laminating practice. The foil preferably is extremely thin aluminum foil between 0.25 mil and 0.5 mil thick, with handling strength provided by its paper backing. The exposed face of the foil has a thin slip coating 14 (FIG. 4) of vinyl resin, or other appropriate thermoplastic resin material, and wax, 1 to 2 pounds of coating material per 3000 square feet of foil, applied from solvent solution and dried, for sealing microscopic pores in the foil and for slip of the coated foil on the mandrel of the spiral winding machine above mentioned. A particularly suitable and economical slip coating consists of vinyl acetate-vinyl chloride copolymer with 5 to 15 percent wax based on total solids. By forming the lining layer or liner 9 from this coated foil-paper laminate, the pervious paper container body is made impervious to the contents of the container at low cost, which is an important consideration in view of the fact that low unit cost is a primary justification for fiber or paper containers with built-in sealing liners. However, the spiral seam, whether of butt or lap form, breaks the continuity of the impervious metal foil liner and becomes the site of detrimental capillary seepage or wicking when the container contents is of a liquid or unctuous nature. This would be no problem if the liner comprised only heavy gauge metal foil strip laid up with a lap joint and joined along the lap, but the cost would be prohibitive.

Positive prevention of wicking at low cost is provided in accordance with the invention by means of the joint sealing metal foil tape 11. This tape is of narrow width in comparison with the width of the lining strip 9 and is arranged in overlapping or spanning relation to the seam 10 continuously along the spiral length thereof and is bonded to the foil face of the lining strip. With this structural arrangement, it will be seen that the spiral seam is completely covered and isolated, thereby preventing contact between the edge of the paper of the lining laminate and the contents of the container. In effect, the container is provided with an impervious metal foil lining throughout its length at a substantial saving in cost in comparison with the cost of the lap wound heavy gauge metal foil strip lining heretofore mentioned.

The seam sealing tape 11 is preferably aluminum foil of a width between about .0375 inch and .625 inch and of between ½ mil and 1.5 mil in thickness. As is illustrated in FIG. 4, the tape is coated on one side with a slip coating 16 of the same kind as the slip coating 14 on the liner foil 13. On its opposite side, the tape is coated with a low temperature heat-sealable thermoplastic bonding or adhesive coating 15, preferably of polyamide resin or plasticized vinyl copolymer or the like, which has the ability to be heat sealed to the coated liner foil 13 at a temperature below the softening point of the slip coatings 14 and 16. The tape coatings are applied from solvent solutions and the solvent evaporated. The softening point of the slip coatings on the tape and the liner foil may be about 300° F. or more, whereas the activating temperature range of the heat-sealable coating 15 on the tape may be from 160° F. to 250° F. Thereby, the important result is realized that heat sealing the foil tape to the liner foil is readily accomplished without softening the slip coatings on the tape and the liner foil which would make them adhere to the mandrel. It is found that heat sealing the tape to the liner foil, seal coating to slip coating, in the temperature range of from 200° F. to 250° F. produces gas and liquid tight bonding of the coated foils to each other, thereby making the container body seepage-proof.

As will be seen from inspection of FIG. 3, about half of the width of the foil tape 11, with its heat-sealable coating side facing outwardly, underlies the liner strip 9 at its trailing edge as the two are being spirally wound on the mandrel of the spiral tube winder to progressively form the tubular liner with adjacent strip edges in abutting relation. Thereby, the liner strip at its leading edge overlies the other projecting half of the foil tape 11 along the spiral seam line and the tape laps or spans the formed seam 10. The slip coated foil side 13 of the liner strip 9 engages the mandrel, as does the slip coated side of the tape 11. By reason of its lower temperature heat-sealable coating 15, the tape is readily heat sealed to the coated foil face of the liner along the seam, without either of them sticking to the mandrel, by heat and pressure applied at point A in any of the conventional ways well known in the heat sealing art. The wax contained in the slip coatings on the mandrel engaging faces of the liner strip and the tape enables them to slip readily on the mandrel as a normal incident to the fabrication of the joint sealed tubular liner assembly. Concurrently with formation of the tubular liner, the successive body layer strips of paper 5 and 6, with adhesive applied to the inner face thereof, are spirally wound in superposed relation thereto, as is conventional in the operation of the spiral tube winder. Thus, a long integral tube structure is formed at high speed with a continuous, smooth built-in sealing liner of metal foil on its inner face, which tube is cut into desired lengths to form individual, foil liner container bodies.

The container as described is particularly adapted for the packaging of unit amounts of foodstuffs and other substances containing moisture or an oily constituent without danger of any of the contents finding its way by capillary seepage or wicking along the spiral seam into the fibrous material of the body wall because the foil sealing tape over the seam and continuous therealong effectively prevents such wicking. The anti-wicking feature is provided simply and at low cost, and the internal metallic appearance of the containers appears to be smooth and seamless because the foil tape is so thin that its presence is hard to discern, as is quite desirable. Since the entire length of the spirally wound containers has a metallized interior of aluminum foil, except for the microscopic thickness of heat sealed joint along the foil tape, danger of product contamination by dislodgement of spiral seam joint fillers or glues, as heretofore used, is avoided and the serious problem of wicking is eliminated so as to give the filled and sealed containers an indefinite shelf or storage life.

While the presently preferred embodiment of the invention that has been found very practical has been illustrated and described, to those skilled in the art it will be apparent that changes may be made therein without departing from the spirit and scope of the invention as defined in the appended claims.

What is claimed is:

1. A seepage-proof container having a tubular body wall formed of a plurality of spirally wound layers of stiff paper stock adhesively secured together,
   (a) an impervious lining laminate consisting of aluminum foil between 0.25 mil and 0.5 mil thick and thin backing paper laminated together and a slip coating of vinyl resin containing wax on the exposed face of the foil,
   (b) said laminate being spirally wound into tubular form with a spiral seam along its length and having its foil side facing inwardly and its backing paper side adhesively secured to the inner side of said body wall and being coextensive in length thereto,
   (c) an aluminum foil tape having a width of between about .375 inch and .625 inch and a thickness of between about ½ mil and 1.5 mil and provided with a slip coating on one face and a low temperature heat-sealable thermoplastic coating on its opposite face which is heat-sealable to said coated metal foil face of said lining laminate at a temperature of about 50° F. below the softening point of said slip coatings,
   (d) said foil tape being disposed in spanning relation to said spiral seam continuously along the length thereof with its heat-sealable coating in contact with and heat-seal bonded to the coated foil face of the edge portions of said lining laminate which it overlies along said seam, thereby completely preventing capillary seepage action from the interior of the container into the paper wall thereof,
   (e) said slip coatings permitting said tape and said lining laminate to slip relative to a mandrel as a normal incident to fabrication of the tape sealed tubular liner assembly.

2. A seepage-proof container having a tubular body wall formed of a plurality of adhesively adhered layers of stiff paper stock spirally wound with butt seams and the seams out of register,
   (a) an impervious lining laminate consisting of aluminum foil between 0.25 mil and 0.5 mil thick and a thin paper backing laminated together and a slip coating of thermoplastic resin containing wax on the exposed face of the foil,
   (b) said laminate being spirally wound into tubular form with its adjacent edges in butt seam relation and having its backing paper side adhesively secured to the inner side of said body wall and coextensive in length thereto,
   (c) an aluminum foil tape having a width of between about .375 inch and .625 inch and a thickness of between ½ mil and 1.5 mil disposed at the inner side of said lining laminate in spanning relation to said lining laminate butt seam continuously along the length thereof and adhesively secured to the coated foil face of the marginal edge portions of said laminate which it overlies along said seam, thereby completely isolating the paper backing of said laminate and said paper wall from the interior of the container,
   (d) said tape having a slip coating on its inner exposed face duplicating the slip coating on the foil face of said lining laminate whereby the tape and the lining laminate may readily slip relative to a mandrel as a normal incident to fabrication of the tape sealed tubular liner assembly.

3. A seepage-proof container having a tubular body wall formed of a plurality of adhesively adhered layers of stiff paper stock spirally wound with butt seams and the seams out of register, (a) an impervious aluminum foil lining between 0.25 mil and 0.5 mil thick laminated to the inner side of said body wall and presenting a spiral butt seam formation along the length of said body wall, (b) said foil lining having a slip coating of vinyl resin on its exposed face for sealing microscopic pores therein and the coating containing wax for slip of the foil relative to a mandrel as a normal incident to the fabrication of the foil lined tubular body wall, (c) an aluminum foil tape having a width of between about .375 inch and .625 inch and a thickness of between ½ mil and 1.5 mil and provided with a slip coating on one face and a heat-sealable coating of polyamide resin on its opposite face which is heat-sealable to said coated liner foil at a temperature of about 50° F. below the softening point of said slip coatings, (d) said tape being spirally wound in spanning relation to said spiral seam formation of said lining foil continuously along the length thereof with its heat-sealable coating in contact with and heat-seal bonded to said coated lining foil, thereby preventing capillary seepage action from the interior of the container into the paper wall thereof.

References Cited in the file of this patent

UNITED STATES PATENTS

| | | |
|---|---|---|
| 2,349,730 | Horning | May 23, 1944 |
| 2,393,347 | Stuart et al. | Jan. 22, 1946 |
| 2,456,387 | Cooper | Dec. 14, 1948 |
| 2,539,450 | Magill | Jan. 30, 1951 |
| 3,035,753 | Erekson | May 22, 1962 |

FOREIGN PATENTS

| | | |
|---|---|---|
| 683,206 | Great Britain | Nov. 26, 1952 |

UNITED STATES PATENT OFFICE
CERTIFICATE OF CORRECTION

Patent No. 3,147,902                          September 8, 1964

Mike Anthony Miller

It is hereby certified that error appears in the above numbered patent requiring correction and that the said Letters Patent should read as corrected below.

Column 1, lines 67 and 68, strike out "of the faces"; column 3, line 7, for ".0375" read -- .375 --.

Signed and sealed this 5th day of January 1965.

(SEAL)
Attest:

ERNEST W. SWIDER                          EDWARD J. BRENNER
Attesting Officer                            Commissioner of Patents